United States Patent
Aldana et al.

(10) Patent No.: US 9,923,587 B2
(45) Date of Patent: Mar. 20, 2018

(54) MOBILE WIRELESS COMMUNICATIONS SYSTEM INCLUDING NFC CARRYING CASE AND RELATED METHODS

(75) Inventors: Leonardo Aldana, Waterloo (CA); John Ivan Scharkov, Waterloo (CA); Andrew Douglas Smart, Kitchener (CA)

(73) Assignee: BlackBerry Limited, Waterloo (CA)

( * ) Notice: Subject to any disclaimer, the term of this patent is extended or adjusted under 35 U.S.C. 154(b) by 261 days.

(21) Appl. No.: 13/474,962

(22) Filed: May 18, 2012

(65) Prior Publication Data
US 2013/0309966 A1 Nov. 21, 2013

(51) Int. Cl.
*H04B 5/00* (2006.01)
*H04B 1/38* (2015.01)
(Continued)

(52) U.S. Cl.
CPC ............. *H04B 1/38* (2013.01); *G06F 1/1613* (2013.01); *G06F 1/1626* (2013.01); *G06F 1/1698* (2013.01); *H04B 5/0075* (2013.01); *H04M 1/04* (2013.01); *G06F 2200/1633* (2013.01); *G06F 2200/1634* (2013.01); *H04M 1/23* (2013.01); *H04M 2250/04* (2013.01); *Y10T 29/49002* (2015.01)

(58) Field of Classification Search
CPC .......... H04B 1/38; H04B 5/0075; H04M 1/04
USPC ........... 455/41.1, 41.2; 307/104; 361/679.01, 361/747
See application file for complete search history.

(56) References Cited

U.S. PATENT DOCUMENTS 7,688,270 B2  3/2010  Tsushima
7,762,470 B2  7/2010  Finn et al.
(Continued)

FOREIGN PATENT DOCUMENTS

WO       2007089158       8/2007
WO    WO20120156783 A1 *  5/2011  ........... H04B 5/0031

OTHER PUBLICATIONS

Joe Davies, NFC Keyboard Offers Touch and Type Convenience, Jan. 10, 2012, pp. 1-3.
DeJesus, "NFC one2Touch foldable full-sized keyboards for smartphones and tablets", Worldwide Tech & Science, Mar. 2012, pp. 1-2.

*Primary Examiner* — Raj Chakraborty
(74) *Attorney, Agent, or Firm* — Guntin & Gust, PLC; Joseph Hrutka

(57) ABSTRACT

A mobile wireless communications system may include a mobile wireless communications device that may include a portable housing, a wireless transceiver carried by the portable housing, and a processor carried by the portable housing and coupled to the wireless transceiver. The mobile wireless communications device may also include a near-field communication (NFC) device coupled to the processor. An NFC carrying case may carry and communicate with the mobile wireless communications device. The NFC carrying case may include a base panel to carry the mobile wireless communications device, and a removable cover panel coupled to the base panel. The NFC carrying case may also include pairs of discontinuous NFC circuit segments carried by the removable cover panel and switch assemblies carried by the removable cover panel. Each switch assembly may selectively couple a respective pair of discontinuous NFC circuit segments to establish NFC communication with the NFC device.

20 Claims, 5 Drawing Sheets

(51) Int. Cl.
    *G06F 1/16*     (2006.01)
    *H04M 1/04*     (2006.01)
    *H04M 1/23*     (2006.01)

(56) References Cited

U.S. PATENT DOCUMENTS

| | | |
|---|---|---|
| 7,899,397 B2 * | 3/2011 | Kumar ........................ 455/41.2 |
| 8,018,344 B2 | 9/2011 | Chang et al. |
| 2009/0033627 A1 | 2/2009 | Aasen |
| 2009/0114556 A1 * | 5/2009 | Tai ........................ H04M 1/185 206/320 |
| 2010/0105451 A1 * | 4/2010 | Wedel .................. H04M 1/236 455/575.1 |
| 2010/0321255 A1 * | 12/2010 | Kough ................ H01Q 1/2266 343/702 |
| 2011/0096513 A1 * | 4/2011 | Kim ............................ 361/747 |
| 2011/0109169 A1 * | 5/2011 | Shimamoto .......... G06K 7/0008 307/104 |
| 2011/0169729 A1 | 7/2011 | Holleis et al. |
| 2012/0229960 A1 * | 9/2012 | Pegg et al. ............... 361/679.01 |
| 2012/0275089 A1 * | 11/2012 | Alameh et al. .......... 361/679.01 |
| 2013/0183899 A1 * | 7/2013 | Gorsev ................. G06F 1/1669 455/41.1 |
| 2013/0293430 A1 * | 11/2013 | Henty ........................... 343/720 |
| 2013/0309964 A1 * | 11/2013 | Hall ........................ H04B 5/00 455/41.1 |

\* cited by examiner

MOBILE WIRELESS COMMUNICATIONS SYSTEM INCLUDING NFC CARRYING CASE AND RELATED METHODS

TECHNICAL FIELD

The present disclosure generally relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
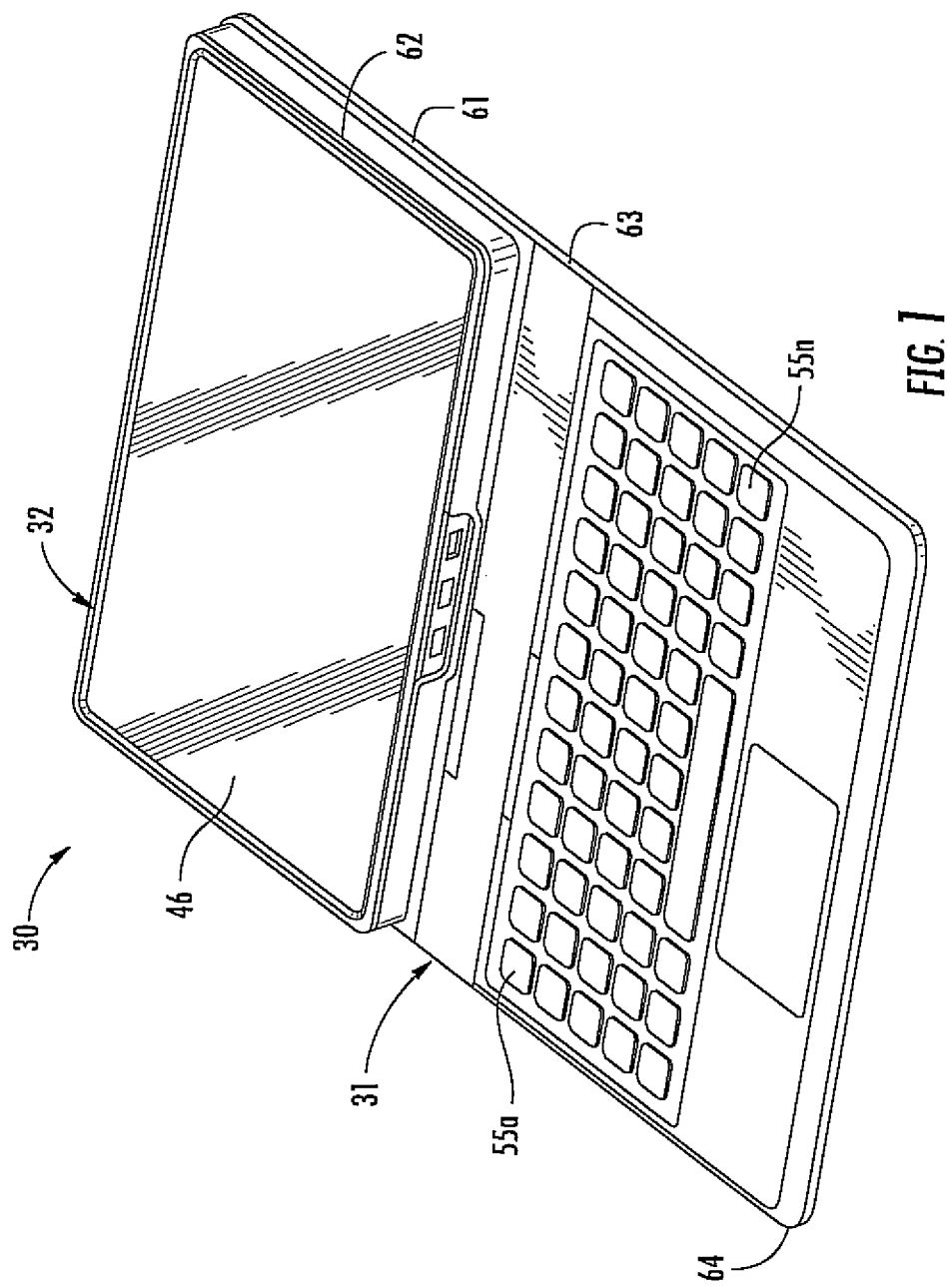
FIG. 1 is a perspective view of a mobile wireless communications system in accordance with an example embodiment.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

In accordance with an example embodiment, a mobile wireless communications system may include a mobile wireless communications device. The mobile wireless communications device may include a portable housing, a wireless transceiver carried by the portable housing, and a processor carried by the portable housing and coupled to the wireless transceiver, for example. The mobile wireless communications device may also include a near-field communication (NFC) device coupled to the processor.

An NFC carrying case may be configured to carry and communicate with the mobile wireless communications device. The NEC carrying case may include a base panel configured to carry the mobile wireless communications device, and a removable cover panel coupled to the base panel and configured to removably cover at least one side of the mobile wireless communications device. The NFC carrying case may also include a plurality of pairs of discontinuous NEC circuit segments carried by the removable cover panel, and a plurality of switch assemblies each carried by the removable cover panel. Each switch assembly may be configured to selectively couple a respective pair of discontinuous NFC circuit segments to establish NFC communication with the NFC device.

Each pair of discontinuous NFC circuit segments may include a pair of discontinuous conductive traces, for example. Each pair of discontinuous NFC circuit segments may include a pair of flexible discontinuous NFC circuit segments.

Each of the plurality of switch assemblies may include an NFC controller. Each NFC controller has a different function associated therewith, for example.

The plurality of switch assemblies may include an array of input keys, for example. The plurality of switch assemblies may be carried by an inner surface of the removable cover panel, for example.

The NFC carrying case may further include a hinge panel coupled between the base panel and the removable cover panel. The NFC carrying case may further include a frame extending outwardly from the base panel, for example. The mobile wireless communications device may be carried within the frame.

A method aspect is directed to a method of making an NFC carrying case for a mobile wireless communications device that may include a portable housing, a wireless transceiver carried by the portable housing, a processor carried by the portable housing and coupled to the wireless transceiver, and a near-field communication (NFC) device coupled to the processor. The method may include forming a base panel to carry the mobile wireless communications device and a removable cover panel coupled to the base panel to removably cover at least one side of the mobile wireless communications device. The method may also include positioning a plurality of pairs of discontinuous NFC circuit segments in the removable cover panel. The method may further include positioning a plurality of switch assemblies on the removable cover panel. Each switch assembly may selectively couple a respective pair of discontinuous NFC circuit segments to establish NFC communication with the NFC device.

Figure 2:
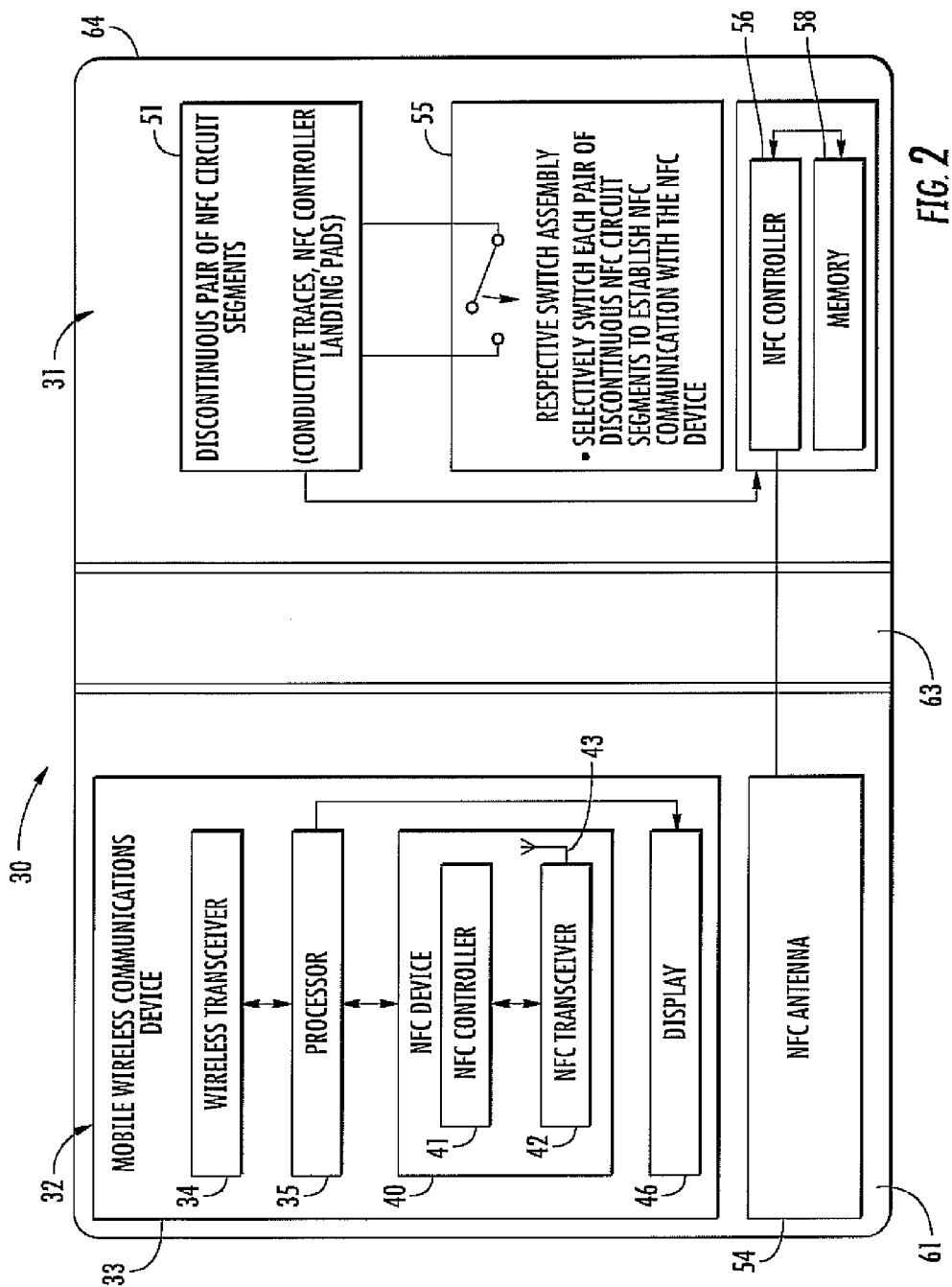
FIG. 2 is a schematic block diagram of the mobile communications system of FIG. 1.

Referring initially to FIGS. 1-2, a mobile wireless communications system 30 illustratively includes a mobile wireless communications device 32 (also referred to as a "mobile device" herein). Example mobile wireless communications devices may include portable or personal media players (e.g., music or MP3 players, video players, etc.), portable gaming devices, portable or mobile telephones, smartphones, tablet computers, digital cameras, etc.

The mobile device 32 illustratively includes a portable housing 33 and a wireless transceiver 34 carried by the portable housing 33. The wireless transceiver 34 may comprise a cellular transceiver or other type of wireless communications transceiver, and may communicate any combination of voice and data, such as, for example, email.

The mobile device 32 includes a display 46 carried by the portable housing 33. The display 46 may comprise a liquid crystal display (LCD) and may be configured to display information relating to data or voice communications. The display 46 may be in the form of an active display that includes a backlight, for example. The display 46 may display email information, contact information, or call information. The display 46 may be another type of display, for example, a passive display, and may display other information.

The mobile device 32 also includes a processor 35 that is carried by the portable housing 33 and coupled with the wireless transceiver 34 and the display 46. The processor 35 may be implemented using hardware (e.g., memory, etc.) and software components, i.e., computer-readable instructions for causing the mobile device 32 to perform the various functions or operations described herein.

The mobile device 32 also includes a NFC device 40 carried by the portable housing 33 and coupled with the processor 35. The NFC device 40 includes a NFC controller 41 and a NFC transceiver 42 coupled with the NFC controller 41.

The NFC device 40 also includes an NFC antenna 43 carried by the portable housing 33. Of course, more than one NFC antenna may be carried by the portable housing 33 and coupled to the NFC transceiver 42.

The NFC controller 41, the NFC transceiver 42, and the NFC antenna 43 advantageously cooperate to perform at least one NFC communication function. For example, the NFC device 40 may communicate directly with an NFC carrying case 31 that is part of the communications system 30 based upon proximity thereto using NFC communication.

The NFC carrying case 31 is an accessory configured to carry mobile device 32. For example, the NFC carrying case 31 may be a protective case as will be described in further detail below.

The NFC carrying case 31 may be configured to communicate directly with the mobile wireless communications device 32. In other words, there may be no intermediate devices or antennas, for example, to expand the range of communications between the NFC device 40 and the NFC carrying case 31. In some embodiments, there may an intermediate device or antenna.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The NFC carrying case 31 is illustratively a flip-type carrying case that includes a base panel 61. A frame 62 extends outwardly from the base panel 61 (FIG. 1). The mobile device 32 is carried within the frame 62. The frame 62 may provide increased protection for the mobile device 32 while being carried. In some embodiments, the NFC carrying case 31 may not include a frame 62.

A hinge panel 63 couples the base panel to a removable cover panel 64 or lid. More particularly, the hinge panel 63 advantageously permits the removable cover panel 64 to be moved to cover the display 46 of the mobile device 32. The removable cover panel 64 may provide increased protection from damage or wear and tear, for example, while be carried, but not in use.

As will be appreciated by those skilled in the art, the removable cover panel 64 may be removed to expose the display 46 of the mobile device 32 during use. Of course, the removable cover panel 64 may cover other parts of the mobile device 32. Additionally, in some embodiments, the removable cover panel 64 may include cover hinge panels so that it may be folded to a reduced size, for example, and may support the NFC carrying case 31 while in use.

Figure 3:
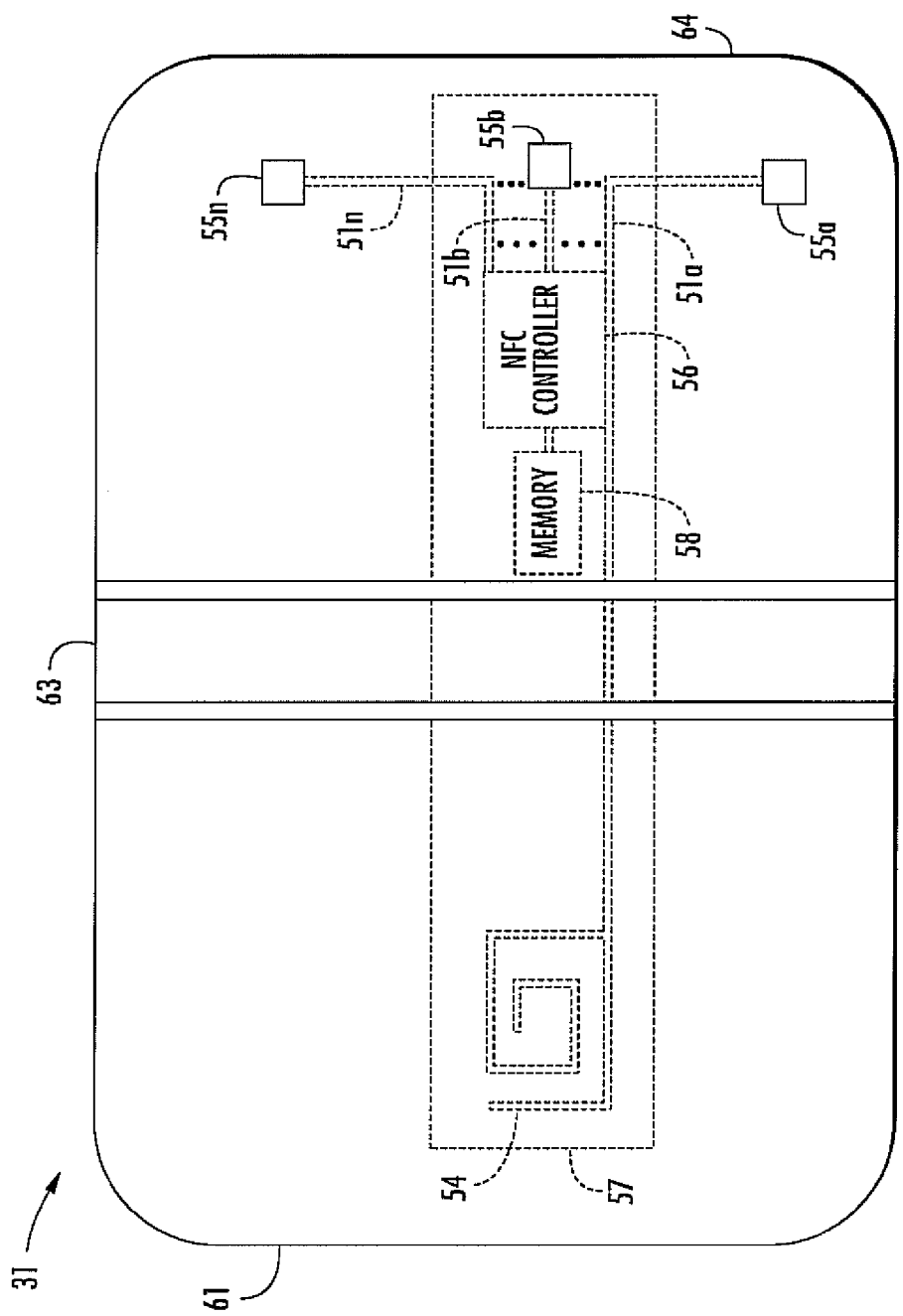
FIG. 3 is a schematic diagram of a portion of the NFC carrying case of FIG. 1.

Referring now additionally to FIG. 3, pairs of discontinuous NFC circuit segments 51$a$-51$n$ are carried by the removable cover panel 64. The discontinuous NFC circuit segments 51$a$-51$n$ are illustratively in the form of discontinuous flexible conductive traces. In some embodiments, the discontinuous pairs of conductive traces 51$a$-51$n$ may be carried by a flexible substrate 57 carried by the removable cover panel 64 and the base panel 61. The discontinuous NFC circuit segments 51$a$-51$n$ may be in the form of other discontinuous circuit portions, for example, antenna portions, as will be appreciated by those skilled in the art.

More particularly, the pairs of discontinuous flexible conductive traces 51$a$-51$n$ may be embedded within the removable cover panel 64. In some embodiments, the pairs of flexible discontinuous conductive traces 51$a$-51$n$ may be secured, via an adhesive, for example, to the removable cover panel 64, and may be covered with a protective layer. The protective layer may be the same color and texture of the removable cover panel 64 for increased aesthetic appeal.

An NFC antenna 54 is carried by the base panel 61 and is coupled to the flexible discontinuous conductive traces 51$a$-51$n$. More particularly, the NFC antenna 54 may also be embedded within the base panel 61. In some embodiments, more than one NFC antenna 54 may be carried by the base panel 61 or, alternatively or additionally, may be carried by the removable cover panel 64. Additionally, as noted above, in some embodiments the NFC antenna may define the pairs of discontinuous circuit segments.

The NFC carrying case 31 also includes an NFC controller 56 and a memory 58, for example, an electronic erasable programmable read-only memory (EEPROM), carried by the removable cover panel 64 and coupled to the NFC antenna 54 and the flexible discontinuous conductive traces 51$a$-51$n$. The NFC controller 56 may also be carried by the flexible substrate 57 and embedded within the removable cover panel 64. Of course, any of the NFC controller 56, the memory 58, and the flexible discontinuous conductive traces 51$a$-51$n$ may be carried or embedded within the base panel 61. Other or additional circuitry may be carried by one or both of the base panel 61 and the removable cover panel 64, for example, energy storage and regulation circuitry.

The NFC controller 56 may cooperate with the memory 58 to perform various NFC communications functions, for example, based upon an input thereto, as will be described in detail below. The NFC controller 56 may perform additional functions, such as, for example, energy storage and regulation, and may also cooperate with additional input devices, for example, a touchpad, as will be appreciated by those skilled in the art.

The NFC carrying case 31 also includes switch assemblies 55$a$-55$n$ in the form of an array of input keys (i.e., a keyboard) coupled to the NFC controller 56. Each input key 55$a$-55$n$ is carried by the removable cover panel 64. More particularly, each input key 55$a$-55$n$ is carried by an inner surface of the removable cover panel 64. In other words, the input keys 55$a$-55$n$ are not visible when the removable cover panel 64 is covering the display 46. The input keys 55$a$-55$n$ are exposed when the NFC carrying case 31 is open, thus allowing access thereto for providing input. By being carried by the inner surface of the removable cover panel 64, the input keys 55a-55n may have increased protection from damage and wear when the mobile device 32 is not in use.

Each input key 55a-55n selectively couples the respective pair of flexible discontinuous conductive traces 51a-51n to establish NFC communication with the NFC device 40. In other words, a segment from one of the flexible discontinuous conductive traces 51a-51n is removed or decoupled, and each input key 55a-55n, which may be in the form of an external jumper, for example, selectively couples the flexible discontinuous conductive traces or closes the circuit or loop.

Based upon which of the input keys 55a-55n and respective flexible discontinuous conductive traces 51a-51n are selectively coupled may determine the type of NFC communication or specific commands or instructions communicated to the NFC device 40. For example, each of the input keys 55a-55n may be mapped to letter of the alphabet or a key on a computer keyboard so that NFC communication established with the NFC device 40 is that of the corresponding letter or key (i.e., an NFC keyboard). Of course, other or additional NFC commands or functions may be communicated to the NFC device 40.

Figure 4:
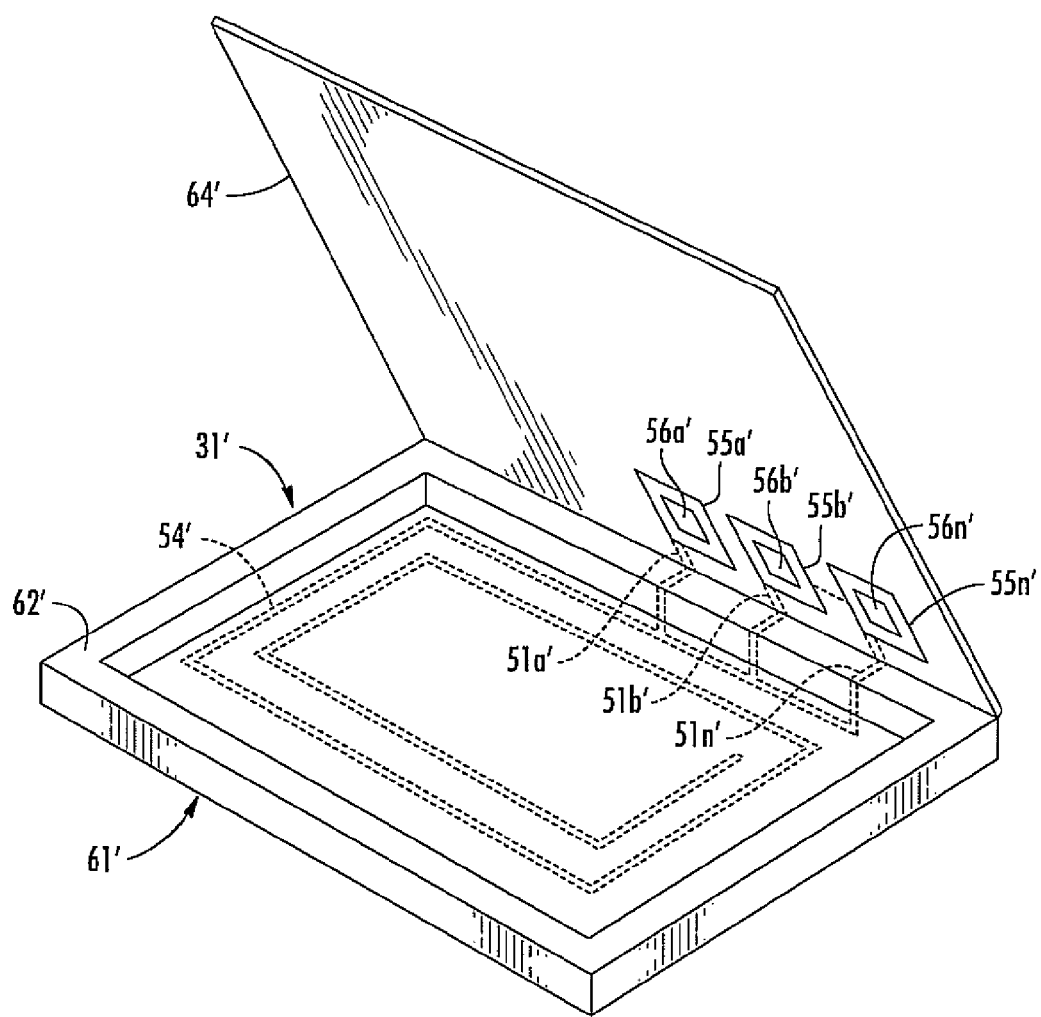
FIG. 4 is a schematic diagram of an NFC carrying case in accordance with another example embodiment.

Referring now to FIG. 4, in another embodiment, each switch assembly 55a'-55n' may include an NFC controller 56a'-56n'. In other words, each NFC controller 56a'-56n' may selectively couple the flexible discontinuous conductive traces 51a'-51n' or discontinuous landing pads for the NFC controller 56a'-56n' to establish NFC communication with the NFC device 40'. As noted above, the type of NFC communication or specific commands or instructions communicated to the NFC device 40' may be based upon the NFC controller 56a'-56n', for example. In other words, each NFC controller 56a'-56n' is decoupled, and may be considered part of the respective switch assembly 55a'-55n', i.e., carried by a pushbutton. As will be appreciated by those skilled in the art, a different switch assembly 55a'-55n' and respective NFC controller 56a'-56n' may be used with the same NFC antenna 54', each having a different NFC code or instructions for sending to the NFC device 40'. For example, each NFC controller 56a'-56n' may include instructions for sending a letter from a keyboard to the NFC device 40'.

In some embodiments, each switch assembly 55a'-55n' may be removable or movable so that a different NFC controller 56a'-56n' may be included or integrated into each switch assembly. Each NFC controller 56a'-56n' may have a different command or instruction set associated therewith and activates the NFC antenna 54' with the different commands. Further details and arrangements of the pairs of discontinuous NFC circuit segments and switch assemblies are described in co-pending application Ser. No. 13/360,250, assigned to the assignee of the present application, and the entire contents of which are herein incorporated by reference.

While the switch assemblies 55a-55n described above are carried by the removable cover panel 64, and the NFC antenna 54 is carried by the base panel 61 it should be understood that any of the NFC antenna and the switch assemblies may be carried by any of the removable cover panel, the base panel, the hinge panel 63, or by other parts of the NFC carrying case 31. For example, the switch assemblies 55a-55n may not be carried by the removable cover panel 64, or, alternatively or additionally, the NFC antenna 54 may be carried by the removable cover panel.

As will be appreciated by those skilled in the art, the NFC carrying case 31 described herein generally does not require a power source, such as, for example, a battery, which is generally required for a typical wireless keyboard. Additionally, the NFC carrying case 31 may not use any cables or power chargers that are typically be associated with a rechargeable battery. The NFC carrying case 31 advantageously eliminates batteries for wireless keyboard functions, which may reduce overall costs. Indeed, as will be appreciated by those skilled in the art, removal of the battery, for example, may reduce thickness of the NFC carrying case 31 by as much as 10%-15%. User convenience may also be increased since there are no batteries to lose charge, which, in a typical wireless keyboard may occur without any notification.

Moreover, any of the above configurations or embodiments may be used alone or in combination with others to achieve a desired function. The discontinuity of the NFC circuit segments 51a-51n may be formed in any number of places or positions, and the implementation of the connection between the switch assemblies 55a-55n and the NFC antenna 54 may depend on the type and size of the mobile device 32.

A method aspect is directed to a method of making an NFC carrying case 31 for a mobile wireless communications device 32 that may include a portable housing 33, a wireless transceiver 34 carried by the portable housing, a processor 35 carried by the portable housing and coupled to the wireless transceiver, and a near-field communication (NFC) device 40 coupled to the processor. The method may include forming a base panel 61 to carry the mobile wireless communications device 32 and a removable cover panel 64 coupled to the base panel to removably cover at least one side of the mobile wireless communications device. The method may also include positioning pairs of discontinuous NFC circuit segments 51a-51n in the removable cover panel 64. The method may further include positioning a plurality of switch assemblies 55a-55n on the removable cover panel 64. Each switch assembly 55a-55n may selectively couple a respective pair of discontinuous NFC circuit segments 51a-51n to establish NFC communication with the NFC device 40.

Exemplary components that may be used in various embodiments of the above-described mobile wireless communications device are now described with reference to an exemplary mobile wireless communications device 1000 shown in FIG. 5. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 5:
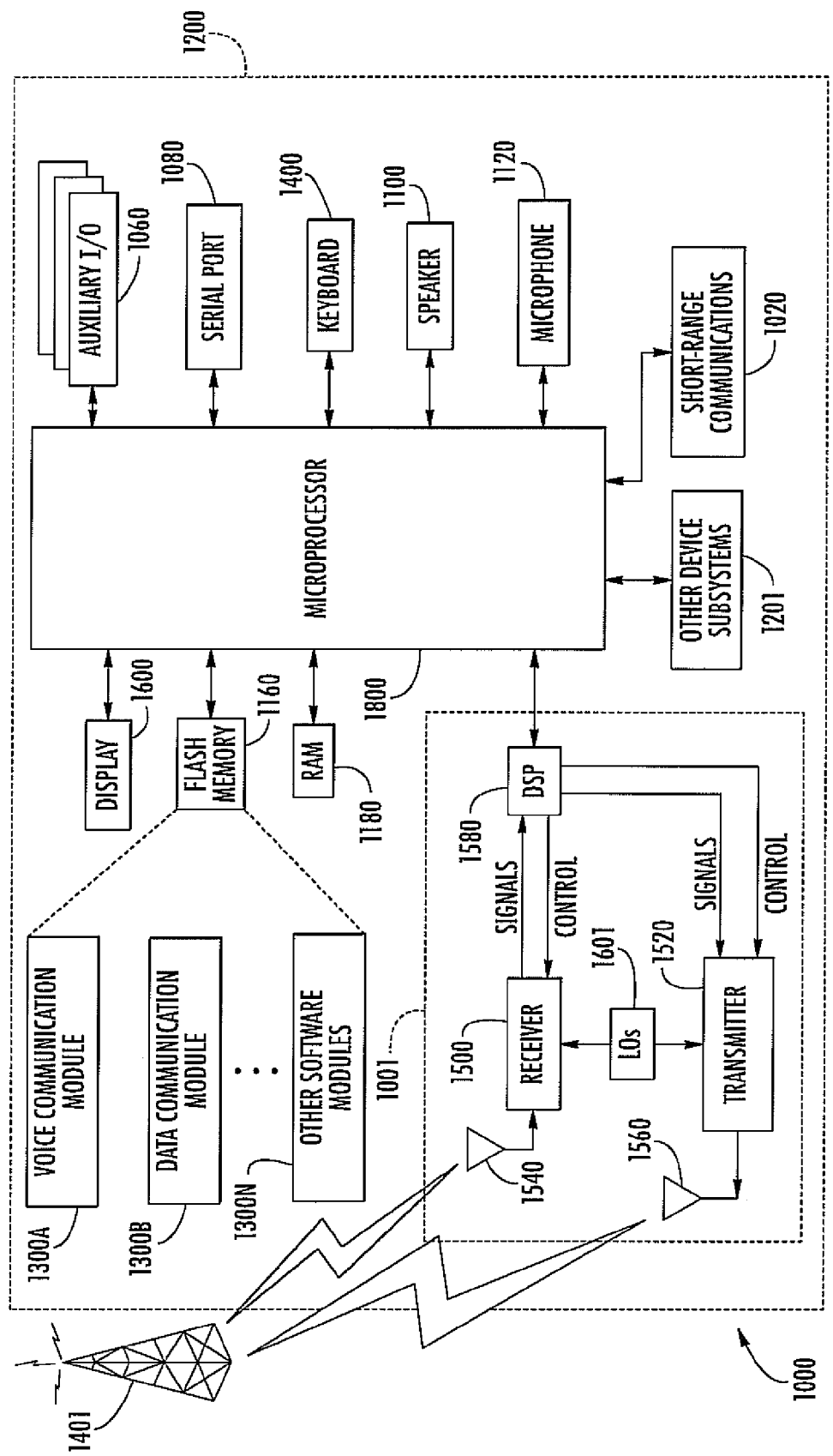
FIG. 5 is a schematic block diagram illustrating additional components that may be included in the mobile wireless communications device of FIG. 1.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem 1020 may include an infrared device and associated circuits and components, near-field communication (NFC), or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A near-field communication (NFC) carrying case configured to carry and communicate with a mobile wireless communications device, comprising:
   a base panel carrying said mobile wireless communications device, wherein the mobile wireless communications device and the NFC carrying case are separate components, wherein the mobile wireless communications device and the NFC carrying case are not connected via a wire, wherein the base panel comprises an antenna including conductive traces, wherein the base panel comprises a frame extending outwardly from the base panel and defining a recess, wherein the conductive traces of the antenna are configured in a winding pattern in the recess, and wherein the recess is configured to carry the mobile wireless communications device;
   a removable cover panel, wherein the removable cover panel is coupled to said base panel and removably covering at least one side of said mobile wireless communications device when in a closed position, wherein the removable cover panel comprises:
      a plurality of pairs of discontinuous NFC circuit segments provided in an interior of said removable cover panel, wherein each pair of discontinuous NFC circuit segments comprises a pair of flexible discontinuous NFC circuit segments, wherein the plurality of pairs of discontinuous NFC circuit segments are connected to the antenna, and
      a plurality of switch assemblies, each switch assembly selectively coupled to a respective pair of discontinuous NFC circuit segments of the plurality of pairs of discontinuous NFC circuit segments, wherein the plurality of switch assemblies comprises an array of input keys for inputting information to an NFC device of the mobile wireless communications device via the antenna, wherein the antenna is activated by a respective pair of discontinuous NFC circuit segments when one of the plurality of switch assemblies is closed,
   wherein the array of input keys is formed on and connected to the NFC carrying case separate from the mobile wireless communications device.

2. The NFC carrying case of claim 1, wherein each pair of discontinuous NFC circuit segments comprises a pair of discontinuous conductive traces, wherein the array of input keys is formed on an inner surface of the removable cover panel, and wherein the array of input keys are not visible when the removable cover panel is in the closed position and the array of input keys are exposed when the removable cover panel is in an open position.

3. The NFC carrying case of claim 1, wherein each of said plurality of switch assemblies comprises an NFC controller, and wherein each NFC controller has a different function associated therewith.

4. The NFC carrying case of claim 1, wherein the NFC carrying case does not include a battery, and wherein the conductive traces include the plurality of switch assemblies and the plurality of pairs of discontinuous NFC circuit segments.

5. The NFC carrying case of claim 1, wherein said NFC carrying case further comprises a hinge panel coupled between said base panel and said removable cover panel.

6. The NFC carrying case of claim 1, the frame is along a periphery of the base panel to define the recess.

7. The NFC carrying case of claim 1, wherein the array of input keys are arranged to define a keyboard on an inner surface of the removable cover panel.

8. A near-field communication (NFC) carrying case for a mobile wireless communications device comprising a portable housing, a wireless transceiver carried by the portable housing, a processor carried by the portable housing and coupled to the wireless transceiver, and an (NFC) device coupled to the processor, the NFC carrying case comprising:
   a base panel carrying the mobile wireless communications device, wherein the NFC carrying case and the mobile wireless communications device are separate components, wherein the base panel comprises an antenna including conductive traces, wherein the base panel comprises a frame extending outwardly from the base panel and defining a recess, wherein the conductive traces of the antenna are configured in a winding pattern in the recess, and wherein the recess is configured to carry the mobile wireless communications device;
   a cover panel coupled to said base panel via a hinge mechanism that folds the cover panel towards the base panel;
   a plurality of pairs of discontinuous NFC circuit segments, wherein each pair of discontinuous NFC circuit segments comprises a pair of flexible discontinuous NFC circuit segments, wherein the plurality of pairs of discontinuous NFC circuit segments are connected to the antenna; and
   a plurality of switch assemblies that are each carried by the cover panel selectively coupled to a respective pair of discontinuous NFC circuit segments, wherein the plurality of switch assemblies comprises an array of input keys for inputting information to an NFC device of the mobile wireless communications device via the antenna, wherein a switch assembly sends a wireless signal to the mobile wireless communications device via the antenna in response to receiving user-generated input from at least one of the array of input keys, wherein the wireless signal is sent using NFC communication, and wherein the array of input keys is formed on and connected to the NFC carrying case allowing a user to separate the array of input keys from the mobile wireless communications device.

9. The NFC carrying case of claim 8, wherein each pair of discontinuous NFC circuit segments comprises a pair of discontinuous conductive traces.

10. The NFC carrying case of claim 8, wherein each pair of discontinuous NFC circuit segments comprises a pair of flexible discontinuous NFC circuit segments associated with the conductive traces of the antenna across the hinge.

11. The NFC carrying case of claim 8, wherein each of said plurality of switch assemblies comprises an NFC controller.

12. The NFC carrying case of claim 11, wherein each NFC controller has a different function associated therewith.

13. The NFC carrying case of claim 8, wherein the array of input keys is carried by an inner surface of said cover panel, and wherein the array of input keys are not visible when the cover panel is in a closed position and the array of input keys are exposed when the cover panel is in an open position.

14. The NFC carrying case of claim 8, wherein the hinge mechanism comprises a hinge panel coupled between said base panel and said cover panel.

15. The NFC carrying case of claim 14, wherein the cover panel comprises another hinge panel that is configured to enable folding the cover panel to a reduced size.

16. A method of making a near-field communication (NFC) carrying case for a mobile wireless communications device comprising a portable housing, a wireless transceiver carried by the portable housing, a processor carried by the portable housing and coupled to the wireless transceiver, and an NFC device coupled to the processor, the method comprising:

forming a base panel to carry the mobile wireless communications device, wherein the NFC carrying case and the mobile wireless communications device are separate components, wherein the base panel is formed with an antenna including conductive traces, wherein the base panel is formed with a frame extending outwardly from the base panel and defining a recess, wherein the conductive traces of the antenna are configured in a winding pattern in the recess, and wherein the recess is configured to carry the mobile wireless communications device;

forming a removable cover panel to removably cover at least one side of the mobile wireless communications device;

positioning a plurality of pairs of discontinuous NFC circuit segments in the removable cover panel, wherein each pair of discontinuous NFC circuit segments comprises a pair of flexible discontinuous NFC circuit segments, wherein the plurality of pairs of discontinuous NFC circuit segments are connected to the antenna; and positioning a plurality of switch assemblies on the removable cover panel, each switch assembly selectively coupling to a respective pair of discontinuous NFC circuit segments to establish NFC communication with the NFC device, wherein the plurality of switch assemblies comprises an array of input keys for inputting information to the NFC device of the mobile wireless communications device, wherein a switch assembly sends a wireless signal via the antenna to the mobile wireless communications device in response to receiving user-generated input from at least one of the array of input keys, and wherein the array of input keys is formed on and connected to the NFC carrying case allowing a user to separate the array of input keys from the mobile wireless communications device.

17. The method of claim 16, wherein each pair of discontinuous NFC circuit segments comprises a pair of discontinuous conductive traces, wherein the array of input keys is formed on an inner surface of the removable cover panel, and wherein the array of input keys are not visible when the removable cover panel is in a closed position and the array of input keys are exposed when the removable cover panel is in an open position.

18. The method of claim 17, wherein each pair of discontinuous NFC circuit segments comprises a pair of flexible discontinuous NFC circuit segments, and wherein the inner surface of the removable cover panel including the plurality of pairs of discontinuous NFC circuit segments is covered by a protective layer.

19. The method of claim 16, wherein each of the plurality of switch assemblies comprises an NFC controller.

20. The method of claim 19, wherein each NFC controller has a different function associated therewith.

* * * * *